United States Patent Office 2,738,640
Patented Mar. 20, 1956

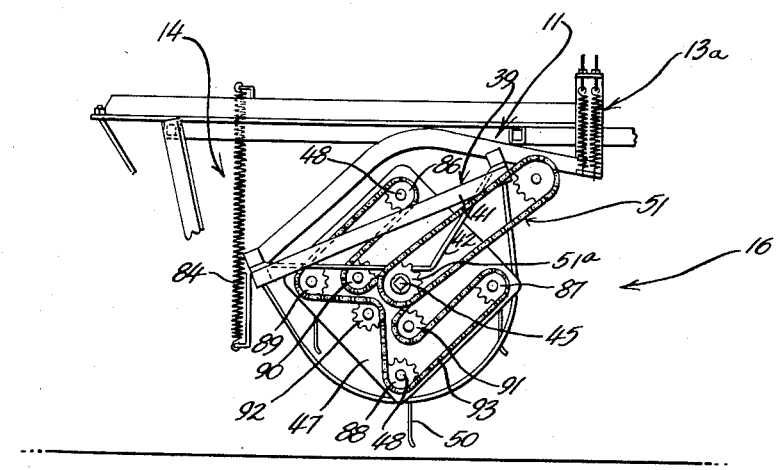
Fig 3
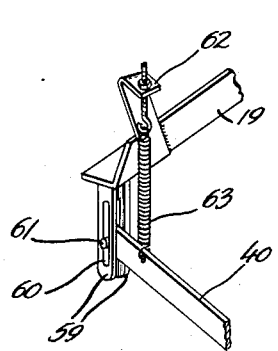
Fig 4
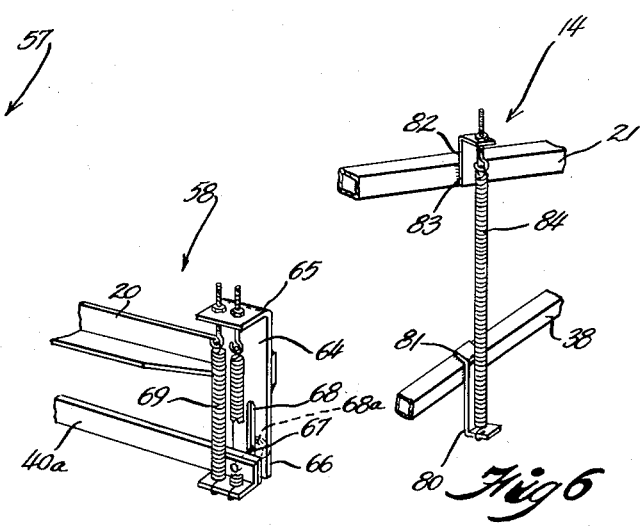
Fig 5
Fig 6
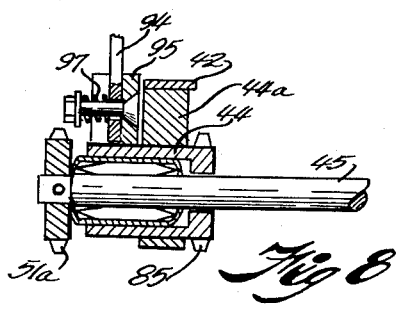
Fig 8

2,738,640

SIDE DELIVERY RAKE

Paul R. Schroeppel, Rockford, Ill., assignor to J. I. Case Company, Racine, Wis., a corporation of Wisconsin Application July 1, 1952, Serial No. 296,563

19 Claims. (Cl. 56—377)

The present invention relates to a side-delivery rake of the type drawn by a tractor, and an object thereof is to generally improve the construction and operation of these machines.

Further objects of this invention are: To provide an improved side-delivery rake incorporating a draft frame supported in elevation by a pair of ground wheels and having a raking reel suspended transversely between said wheels from the draft frame; to provide an improved means for driving the reel from the ground wheels; to provide an improved side-delivery rake wherein the reel will automatically adjust its position to the irregularities of the terrain over which it is required to travel; to provide an improved mounting for the reel of a side-delivery rake wherein the skipping action of spring suspended reels of prior machines is eliminated; to provide an improved side-delivery rake wherein the reel is so suspended from the main frame as to permit the operator to rake up to the borders in irrigated fields and close to fences and similar places; to provide an improved suspension means whereby the reel may be conveniently and completely retracted from its operative position; and to provide a side-delivery rake which is simple and economical to manufacture and which is more durable and efficient than prior constructions have proven to be.

A side-delivery rake embodying the preferred form of this invention is shown in the accompanying drawings.

Fig. 3 is a view taken in the direction of line 3—3 of the rake shown in Fig. 2, with parts removed.

Fig. 4 is a detailed perspective view somewhat enlarged of the left forward suspension means.

Fig. 5 is a detailed perspective view somewhat enlarged of the right forward suspension means.

Fig. 6 is a detailed perspective view somewhat enlarged of the rear suspension means.

Fig. 7 is a view looking in the direction indicated in line 7—7 of Fig. 2 showing the connection of the elevating means to the reel supporting frame, slightly enlarged and with parts removed.

Fig. 8 is a vertical sectional view, somewhat enlarged, showing details of the tine angle adjustment mechanism.

Figure 1:
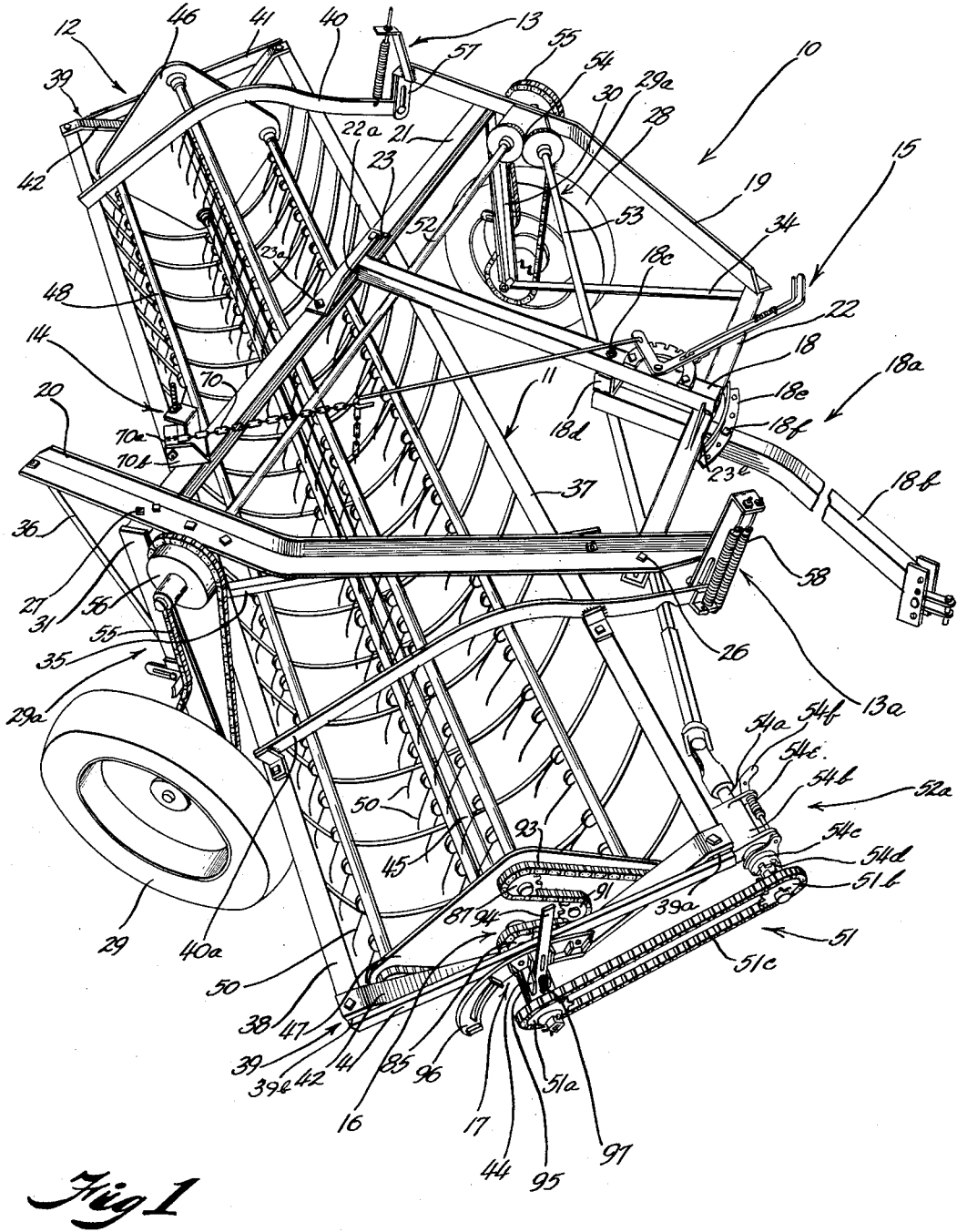
Fig. 1 is a right-front elevational perspective view of a side-delivery rake disclosing the present invention.

The preferred form of side-delivery rake embodying this invention comprises a draft or main frame 10 from which is suspended a reel supporting frame 11, with its reel 12, by a three-point suspension means 13, 13a and 14, and an elevating means 15. The reel 12 is equipped with a tine-rod positioning means 16 and an angle adjusting means 17.

As shown herein the main frame 10, in the present instance, comprises a center bar 18, a pair of angle bars 19 and 20, and cross members 21 and 22. The center bar 18 has welded or secured by any other suitable means, indicated as 22a to its rearward end a bracket 23, which bracket is bolted or fastened by any other means, indicated at 23a to the cross member 21 so that the cross member 21 is secured with the center bar 18 substantially normal thereto and substantially at the center of member 21. The cross member 22 is secured at 23b as by welding or similar means to the center bar 18 substantially at the center of cross member 22 and substantially parallel with the cross member 21. The inwardly and forwardly converging angle bars 19 and 20 are secured adjacent the ends of the cross members 21 and 22 by means of bolts or similar fastening means 24, 25, 26 and 27. Main frame 10 is supported for transport on wheels 28 and 29 a suitable distance from the ground by means of a drop axle 29a. The drop axle 29a can be considered as including the member 21 and supports 30 and 31 which are secured at 30a and 30b respectively to the opposite extremities of member 21 and extend downwardly therefrom. Stub axles 32 and 33 are secured to the supports 30 and 31 in holes provided therein and form the conventional journals for the wheels 28 and 29 which are free to rotate independently of each other. To further brace the supports 30 and 31 with respect to the frame 10, support members 34, 35, and 36 extend from the angle bars 19 and 20 to the supports 30 and 31, the members 35 and 36 being braced between the support 31 and the angle bar 20, and the member 34 being braced between the support 30 and the angle bar 19.

A draft means, generally indicated at 18a, comprises a forwardly and downwardly extending drawbar 18b pivotally secured to the center bar 18 as at 18c and spaced therefrom, as by a spacer 18d. The drawbar 18b is mounted to swing in a horizontal plane and is capable of being locked in a plurality of positions on an arcuate locking plate 18e as by a bolt or the like 18f. The draft means as disclosed is only one of the several that may be advantageously employed to permit the application of a traction force at adjusted angles or freely pivoted, as desired. The forward extremity of the drawbar 18b is adapted to have the usual connection made thereto for attachment to a tractor or other suitable propelling means.

The reel-supporting frame 11, as herein shown, is of rectangular form, comprising a pair of side members 37 and 38, a pair of end supports 39 and parallel pivot supporting arms 40 and 40a. The side members 37 and 38, preferably steel tubing or other suitable materials, are welded or otherwise secured at their ends to the end supports 39, as indicated respectively at 39a and 39b. As clearly seen in Fig. 3, the end supports 39 are of triangular form, each comprising a straight bar 41 and an angular-shaped bar 42. On the latter are mounted journal bearings generally designated as 43 and 44 for a shaft 45 of the reel 12. It will be noted in the drawings that the reel 12 is suspended from the frame 10 between the wheels 28 and 29, so that a plane thru the axis of the reel 12 substantially normal to the horizontal intersects a plane through the axes of the ground wheels substantially normal to the horizontal at substantially a 45 degree angle, the right hand wheel 29 lying rearward of the reel 12 and the left hand wheel 28 lying forward of the reel 12. This novel positioning of the reel between the transport wheels 28 and 29 permits the reel to respond to irregularities in terrain much more readily than reels on side-delivery rakes which are positioned either rearwardly or forwardly of the transport wheels and allows the operator to exercise a greater degree of control over the reel as far as height control and movement to the left or right is concerned, as will be explained more clearly hereinafter. It should be further appreciated that whereas prior side-delivery rakes are cumbersome and complex in construction, customarily employing a pair of forward wheels and one or even two caster wheels, the present side-delivery rake is substantially symmetrical in construction and is simple and easy to maneuver.

The reel 12 as shown comprises a pair of rectangularly-spaced end members 46 and 47 secured to the shaft 45 and spanned by a number of tine-rods 48. The tine-rods 48 have attached thereto the required number of tines 50 which, during the rotation of the reel 12, are maintained in vertical position through the action of the tine-rod positioning means 16, as will appear more clearly hereinafter.

The reel 12 is revolved in the frame 11 by means of a sprocket and chain mechanism 51 connected to an axle shaft 52 by a transmitting means 52a, a universally-pivoted telescopic shaft 53, and beveled gears 54. Rotation of the wheels 28 and 29 is transmitted to the shaft 52 by means of sprocket and chain mechanisms 55, the shaft 52 and the sprocket and chain mechanisms 55 being considered as a part of the drop axle construction 29a. Conventional spring-and-pawl members 56 are associated with the sprocket and chain mechanisms 55 to provide a suitable differential effect by allowing the outside wheel, when making a turn, to overrun, or rotate faster than the inside wheel.

The transmitting means 52a includes in the present instance a shaft 54a rotatably carried in a suitable bracket 54b secured to the side member 37. The shaft 54a has a suitable connection on its inner end for universal connection with the telescopic shaft 53. The sprocket and chain mechanism 51 comprises in the present instance a sprocket 51a nonrotatably secured to the shaft 45, a sprocket 51b rotatably journaled on the shaft 54a, and a power transmitting chain 51c. A suitable clutch, including in the present instance a driving member 54c, a driven member 54d, and a resilient means 54e for maintaining the driving member and driven member in driving engagement, is provided for transmitting the rotation of the shaft 54a to the sprocket 51b and consequently to the reel 12. A throw-out means 54f is provided for over-coming the resilient means 54e and disengaging the driving member 54c from the driven member 54d thereby interrupting the transmission of motion from the wheels 28 and 29 to the reel 12. This is desirable when the machine is to be transported any great distance as for instance from its place of storage to the field.

By revolving the reel 12 through power derived from the ground wheels 28 and 29, the rotation of the reel will be proportional to the ground speed of the machine. In spite of the variations in the positions of the reel with respect to the draft frame 10, as will be explained hereinafter, this ground wheel drive maintains constant connection with the reel by means of the shaft 53. Being formed of telescopic sections, the length of the shaft 53 may vary according to the positions of the reel with respect to the draft frame 10 as well known in the art.

As already mentioned the reel-supporting frame 11 is resiliently suspended from the main frame 10 by the three-point suspension means 13, 13a and 14. As most clearly shown in Fig. 1, the forward portion of the reel-supporting frame 11 is pivotally and resiliently supported in slidable spring suspended hinges 57 and 58 comprising the suspension means 13 and 13a respectively. The spring suspended hinge 57, see Fig. 4, comprises, in the present instance, a pair of parallel and adjacent downwardly extending members 59, welded or otherwise secured to the rearward extremity of the angle bar 19. The downwardly extending members 59 are provided with aligned slots 60 running substantially vertical in the members 59. The pivot supporting arm 40 is secured to the side members 37 and 38 of the reel-supporting frame 11 and extends forwardly between the parallel members 59, and pivotally supported therebetween by a pivot 61 secured adjacent the forward extremity of the arm 40 and extending through the slots 60 of the members 59. The arm 40 is movable up and down between said members 59, the pivot 61 being slidable along the confines of the slots 60. An upwardly extending arched member 62 is secured adjacent the rearward extremity of the angle bar 19, and a spring 63 is interposed between the lifting arm 40 and the upper bent portion of the arched member 62, substantially counterbalancing the downward force of the weight of the reel 12 and frame 11 upon the extremity of the lifting arm 40 as will appear more clearly hereinafter.

The slidable spring suspension hinge 58, see Fig. 5, comprises, in the present instance, an arched member 64 provided with a bent portion 65 and a slotted portion 66. The arched member 64 is secured as by welding to the forward extremity of the angle bar 20 so that the slotted portion 66 is downward of the angle bar 20 and the bent portion 65 is upward of the angle bar 20. The pivot supporting arm 40a, like the pivot supporting arm 40, is secured to the side members 37 and 38 of the reel-supporting frame 11, and extends forwardly substantially normal to the members 37 and 38 and is pivotally supported adjacent its forward extremity as by a pivot 67 ridable in the confines of a slot 68 formed in the slotted portion 66 of the arched member 64. Interposed between the bent portion 65 of the member 64 and the arm 40a is a pair of springs 69 which springs exert an upward force upon the arm 40a which substantially counterbalances the downward force of the weight of the frame 11 and rest 12 upon the forward extremity of the arm 40a. The pivot 67 is provided with a stop 68a for preventing displacement of the pivot from the slot 68. It will be noted that the slidable spring suspension hinge 57 is provided with one spring as compared to the two springs 69 which are associated with the slidable spring suspended hinge 58, but it will be understood that this is due to the distribution of the weight of the reel, and the number of springs used on any one or both of the hinges is of no importance in regard to the principles behind the present invention.

Figure 2:
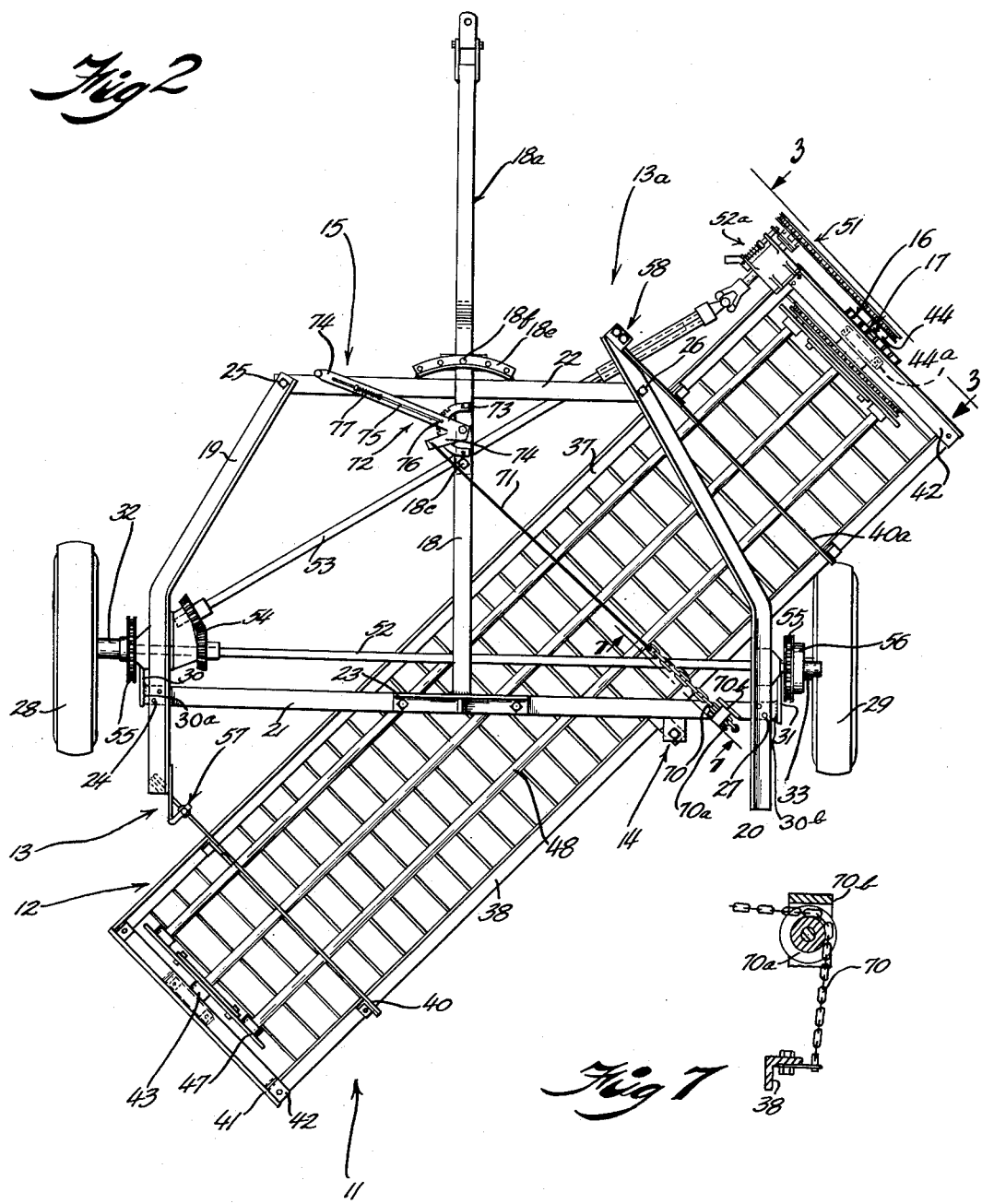
Fig. 2 is a plan view of the rake shown in Fig. 1.

To limit the downward pivotal movement of the reel supporting frame about the pivots 61 and 67 of the pivot supporting arms 40 and 40a, elevating means 15 is provided, see Figs. 2 and 7. The elevating means 15 comprises a chain which is trained rearwardly about a pulley 70a carried by a bracket 70b welded to frame member 21 and which is secured adjacent its rearward end to the side member 38 of the reel-supporting frame 11 and adjacent its forward end to a connecting rod 71 of a lever assembly 72. The lever assembly 72 provides an arcuate toothed rack 73 secured to the center bar 18, and a lever 74 pivotally secured to the center bar 18 so as to swing in the plane of arcuate toothed rack 73 and adjacent thereto. A rod 75 is secured adjacent and parallel to the lever 74 and carries adjacent its lower end a dog 76 which is urged by means of a spring 77 into cooperative relationship with the teeth of the rack 73. The connecting rod 71 is secured adjacent its forward extremity to an ear 78 of the lever 74.

It will be noted that when the lever 74 is swung forward, the connecting rod 71 is moved forward, which in turn pulls upon the chain 70 which in turn pulls upon the side member 38. This pull of the chain 70 upon the side member 38 of the reel-supporting frame 11 raises the frame 11 upwardly about the pivots 61 and 67 of the arms 40 and 40a, which as already noted, are supported and slidable in the slots 60 and 68 of the hinges 57 and 58 respectively. If the lever 74 is swung rearwardly, the weight of the reel supporting frame 11 will bias the reel frame downwardly, Fig. 1, about the pivots 61 and 67 of the arms 40 and 40a as already described. It should be clear that the position of the reel 12 is dependent upon the position of the lever 74 of the elevating means 15, and that the position of the reel 12 with respect to the ground can be changed from a complete elevation for transporting the machine to any other desirable adjustment to meet the varying conditions as the machine operates over irregular terrain.

In the operation of this side-delivery rake, the reel is pivoted by the elevating means 15 so that the ends of the tines 50 on the lowermost tine-rod 48 will barely contact the ground as the rake is drawn forwardly. In order that the reel frame 11 can rapidly and lightly react to the irregularities in the terrain without damaging the tines 50, the hereinbefore mentioned suspension means 14 is interposed between the side member 38 of the reel frame 11 and the cross member 21 of the main frame 10, see Fig. 6. The suspension means 14 comprises a downwardly extending arched member 80 secured to the side member 38 as at 81, and an upwardly extending arched member 82 secured to the cross member 21 as at 83. A spring means 84 is yieldingly interposed between the members 80 and 82 and substantially counterbalances the weight of the reel-supporting frame 11 when the tines 50 of the lowermost tine-rod 48 barely contact the ground, thereby resiliently suspending the reel-supporting frame 11 about a point in the slots 60 and 68 of the hinges 57 and 58.

As the rake is drawn over the ground, the tines 50 upon contact with any irregularity in the ground will pivot the reel-supporting frame 11 upwardly about the suspension means 13 and 13a comprising hinges 57 and 58, respectively, the spring means 84, as already mentioned, substantially counterbalancing the weight of the frame 11, and thereby permitting the frame 11 to respond rapidly to the slightest push upwardly upon the tines 50. Forwardly the rake is resiliently suspended, as far as movement up and down is concerned, in the slots 60 and 68 by the springs 63 and 69, the upward force of these springs being only slightly less than the force of the weight of the frame 11 upon the pivot supporting arms 40 and 40a. As the tines 50 meet sudden obstructions the reel-supporting frame 11 is pivoted upwardly about the pivots 61 and 67 of the arms 40 and 40a. Since the length and force of the spring 84 decreases as the frame 11 is raised, the weight of the frame 11 will rapidly settle the frame when the obstruction is passed. This downward pivotal movement of the frame 11 raises the pivots 61 and 67 of the arms 40 and 40a upwardly in the slots 60 and 68 as the downward pivotal movement is restrained by the spring means 84. It will be clear that by allowing the pivoted frame to rock to and fro, between the resilient means 63, 69 and 84, that the skipping effect, which occurs in all prior rakes which have sesiliently suspended reel frames, is dissipated and the reel 12 is more readily returned to its operative position. It should also be noticed that if the rake is drawn over a slight rise in the ground, an irrigation bank for example, that the pivots 61 and 67 of the arms 40 and 40a are pushed upwardly in the slots 60 and 68 of the hinges 57 and 58. The arms 40 and 40a are thereby pivotal from a point remote from the bottom of the slots 60 and 68 thus permitting the frame 11 to respond to abrupt irregularities in the slight rise in the ground in the same manner as if the general level of the ground being raked is the same as the ground upon which the rake is being drawn.

The tine-rod positioning means 16 is mounted on the rectangular-shaped end member 47 of the reel 12. This means comprises a stationary pilot sprocket 85, see Figs. 1 and 8, and a series of lateral sprockets 86, 87, 88 and 89, see also Fig. 3, sprocket 85 and sprockets 86, 87, 88, and 89, having the same number of teeth, there also being idler sprockets 90, 91, and 92, all connected by a sprocket chain 93. The sprocket 85 is fixed in relation to a sleeve 85a forming part of the journal bearing 44 in which the shaft 45 of the reel 12 is supported and sleeve 85a is rockable in a yoke 44a, Fig. 2, fixed on frame member 42, for adjusting sprocket 85, as will appear. The sprockets 86, 87, 88, and 89 are secured one on each of the tine rods 48 laterally of the rectangular-shaped end member 47. The sprocket chain 93 extends around these sprockets 86, 87, 88, and 89 and idlers 90, 91 and 92 whereby, during rotation of the reel 12 under the action of the sprocket and chain mechanism 51 the tine-rods 48 are controlled independently of the shaft 45 so as to keep the tines 50 always parallel and to maintain the pitch of the tines relative to the terrain constant during operation. This is accomplished by passing the chain 93 around the sprocket 86 and under the idler 90. The chain 93 is then trained across the upper portion of the fixedly positioned sprocket 85 and under the idler sprocket 91. After leaving the idler sprocket 91, the chain 93 engages the sprockets 87 and 88 and then the idler 92, and then the sprocket 89 as is shown in Fig. 3. The idler sprocket 91 is adjustable on the end member 47 so that the slack in the sprocket chain 93 may be properly adjusted.

For adjusting the tines to any desired pitch, the pilot sprocket 85 is adjusted by the angle adjusting means 17. The adjusting means 17 comprises a lever 94 pivotally secured to the sleeve 85a of bearing 44 for the shaft 45 of the reel 12 by means of a bracket 95. The lever 94 extends upwardly and is in cooperative relation with a lugged arcuate rack 96 which in turn is secured as by welding to the straight bar 41 of the end support 39. The lever is urged against the rack 96 by means of a spring 97 compressed against the lower extremity of the lever 94, and retained in position as far as movement forward and backward is concerned by the lugs of the lugged arcuate rack 96. By moving the lever 94 the sleeve 85a is rotated a corresponding distance which in turn rotates the pilot sprocket 85. Since the pilot sprocket 85 operates in conjunction with the sprockets 86, 87, 88, and 89 through the chain 93, the pitch of the tines is dependent upon the position of the pilot sprocket 85, the pitch changing in relation to the rotated position of the sprocket 85.

The conventional rake of the type having the drive wheels ahead of the reel is capable of being pivoted around either of the drive wheels when turning a corner. It is well known when the conventional rake makes a turn to the right for instance the reel is swung around in an arc, the radius of the arc being the distance from the right wheel to the left end of the reel 12 or the distance from the left wheel to the left end of reel 12 depending upon the sharpness of the turn and which wheel is acting as the pivot wheel. This sweeping out of the reel accordingly sweeps out the windrow and forms loops at the end of each windrow requiring considerable maneuvering by the follow-up machine. Having the reel mounted between the wheels as already clearly described substantially eliminates the sweeping out of the reel when the rake is turning a corner, the arc of travel of the end of the reel when either the left wheel or the right wheel is the pivot wheel, substantially lying within the windrow as previously formed. It should be appreciated that by eliminating the sweeping out effect, that the machine that follows the rake can be drawn in a relatively straight line and the considerable maneuvering at the turns and corners required of the follow-up machine when following a conventional rake is eliminated. It should be also noted that by having the wheels mounted in relation to the reel as described allows the rake to be balanced and consequently connected to the tractor or other draft means easily and safely, there being no excessive weight or upward thrust on the drawbar.

Having now described my invention, it will be understood that various changes may be made in the details of construction without departing from the spirt and scope of the invention as defined by the appended claims.

I claim:

1. In a side delivery rake comprising a supporting frame adapted to be held at its forward end by a draft vehicle and at its rearward end by a two wheel drop axle comprising a cross member and a pair of downwardly extending supports, a pair of spaced wheels rotatably secured adjacent the lower ends of said supports for supporting said supporting frame in an elevated position, said wheels being positioned in substantially coaxial relationship, and a shaft rotatably secured adjacent the upper end of said supports and drivingly connected to said wheels, a reel supporting frame suspended from said supporting frame and positioned at an angle from the right front to the left rear so as to intersect a plane substantially normal to the horizontal through the axes of said wheels, a reel rotatably journaled in said reel supporting frame, means for driving said reel at its right front end from said shaft, said means for driving said reel comprising an extensible driving shaft extending substantially parallel with the angularly positioned reel supporting frame and drivingly connected with said shaft adjacent the left wheel and to said reel adjacent the right end thereof.

2. A side-delivery rake comprising a supporting frame adapted to be held at its forward end by a draft vehicle and at its rearward end by a drop axle including a cross member and a pair of downwardly extending supports, a pair of wheels rotatably carried adjacent the lower ends of said supports for supporting said supporting frame in an elevated position, said wheels being positioned in substantially coaxial relationship, a shaft journaled adjacent the upper end of said supports, and a chain drive for imparting the rotary motion of said wheels to said shaft, a reel supporting frame suspended from said supporting frame and positioned between said wheels so as to intersect the distance between said wheels from the right front to the left rear, a reel rotatably journaled in said reel supporting frame, means for driving the reel at its right front end from a position adjacent the left wheel, said means for driving said reel comprising an extensible driving shaft extending substantially parallel with the angularly positioned reel supporting frame, a pair of bevelled gears associated with said shaft imparting rotation to said extensible driving shaft, and a pair of sprockets and a chain at the forward end of said extensible driving shaft associated with said reel and imparting rotation to said reel.

3. A side delivery rate comprising a supporting frame adapted to be held at its forward end by a draft vehicle and at its rearward end by a drop axle including a cross member and a pair of downwardly extending supports, a pair of wheels rotatably secured adjacent the lower ends of said supports for supporting said supporting frame in an elevated position, said wheels being positioned in substantially coaxial relationship, a shaft journaled adjacent the upper end of said supports, and a chain drive for imparting the rotary motion of said wheels to said shaft, a reel supporting frame suspended from said supporting frame and positioned between said wheels so as to intersect the distance therebetween at substantially a 45 degree angle, a reel rotatably journaled in said reel supporting frame, a vertical plane through the axis of said wheels intersecting the axis of said reel at a point adjacent the center of the axial length of said reel, means for driving the reel at its right front end from a position adjacent the left wheel, said means for driving said reel comprising an extensible driving shaft extending substantially parallel with the angularly positioned reel supporting frame, a pair of beveled gears associated with said shaft for imparting rotation to said extensible driving shaft, and a pair of sprockets and a chain adjacent the forward end of said extensible driving shaft and associated with said reel and imparting rotation thereto.

4. A side-delivery rake comprising a supporting frame adapted to be supported at its forward end by a draft vehicle and by its rearward end by a drop-axle including a cross member and a pair of downwardly extending supports, a pair of wheels rotatably secured adjacent the lower ends of said supports for movably supporting said supporting frame in an elevated position, said wheels being positioned in substantially coaxial relationship, a shaft journaled adjacent the upper end of said supports, and a chain drive for imparting the rotary motion of said wheels to said shaft, a reel supporting frame, means for pivotally securing said reel supporting frame adjacent its forward end to said supporting frame so as to position said reel supporting frame between said wheels from the right front to the left rear, said reel-supporting frame being biased to swing downwardly, means interconnected between said reel supporting frame adjacent its rearward end and said supporting frame for holding said reel supporting frame against downward swinging movement in predetermined positions with respect to the ground, means for resiliently suspending said reel supporting frame in said pivoting means for pivotally yieldingly suspending said reel supporting frame, a reel rotatably journaled in said reel supporting frame, a vertical plane through the axis of said wheels intersecting the axis of said reel at a point adjacent the center of the axial length of said reel, means for driving the reel at its right front end from a position adjacent the left wheel, said means for driving said reel comprising an extensible driving shaft extending substantially parallel with the angularly positioned reel supporting frame, a pair of beveled gears associated with said shaft for imparting rotation to said extensible driving shaft, and a pair of sprockets and a chain at the forward end of said extensible driving shaft associated with said reel and imparting rotation to said reel.

5. A side-delivery rake comprising a supporting frame adapted to be held at its forward end by a draft vehicle and at its rearward end by a drop axle including a cross member and a pair of downwardly extending supports, a pair of wheels rotatably secured adjacent the lower ends of said supports for supporting said supporting frame in an elevated position, said wheels being positioned in substantially coaxial relationship, a shaft journaled adjacent the upper ends of said supports, and a chain drive for imparting the rotary motion of said wheels to said shaft, a reel supporting frame, means for pivotally securing said reel supporting frame adjacent its forward end to said supporting frame so as to position said reel supporting frame between said wheels so that the right-hand wheel is rearward of said reel supporting frame and the left-hand wheel is forward of said reel supporting frame, said reel supporting frame being held against fore-and-aft movement while being biased to swing downwardly, means interconnected between said reel supporting frame and said supporting frame for holding said reel supporting frame against swinging movement downwardly in predetermined positions with respect to the ground, a reel rotatably journaled in said reel supporting frame, a vertical plane through the axis of said wheels intersecting the axis of said reel at a point adjacent the center of the axial length of said reel, means for driving the reel at its right front end from a position adjacent the left wheel, said means for driving said reel comprising an extensible driving shaft extending substantially parallel with the angularly positioned reel supporting frame, a pair of bevelled gears associated with said shaft imparting rotation to said extensible driving shaft, and a pair of sprockets and a chain at the forward end of said extensible driving shaft associated with said reel and imparting rotation to said reel.

6. A side delivery rake comprising a supporting frame adapted to be held at its forward end by a draft vehicle and at its rearward end by a drop axle including a cross member and a pair of downwardly extending supports, a pair of wheels rotatably secured adjacent the lower ends of said supports for supporting said supporting frame in an elevated position, said wheels being positioned in substantially coaxial relationship, a shaft journaled adjacent the upper ends of said supports, and a chain drive for imparting the rotary motion of said wheels to said shaft, a reel, a reel supporting frame for rotatably supporting said reel therefrom, means for pivotally securing the right front and left front of said reel supporting frame from said supporting frame so that the right wheel is rearward of said reel supporting frame and the left wheel is forward of the reel supporting frame, said reel supporting frame being held against fore-and-aft movement while being biased to swing downwardly, resilient means interconnected between said supporting frame and said reel supporting frame for counterbalancing the downward swinging movement of said reel supporting frame, means for resiliently suspending said reel supporting frame in said supporting means for floatingly pivotally suspending said reel, means carried by said supporting frame and operatively associated with said supporting frame for swinging said reel supporting frame from an operative position to a transport position, means for driving the reel from its right front end from a position adjacent the left wheel, a vertical plane through the axis of said wheels intersecting the axis of said reel at a point adjacent the center of the axial length of said reel, said means for driving said reel comprising an extensible driving shaft extending substantially parallel with the angularly positioned reel supporting frame, a pair of bevelled gears associated with said shaft imparting rotation to said extensible driving shaft, and a pair of sprockets and a chain adjacent the forward end of said extensible driving shaft associated with said reel and imparting rotation to said reel.

7. In a side-delivery rake having a draft frame, ground wheels for supporting said draft frame in an elevated position, said wheels being positioned in substantially coaxial relationship, a reel, and a reel supporting frame for rotatably carrying said reel, the combination with said rake of means for resiliently suspending said reel supporting frame from said draft frame so as to position said reel transversely from the right front to the left rear between said ground wheels, a vertical plane through the axis of said wheels intersecting the axis of said reel at a point adjacent the center of the axial length of said reel, said means including means for pivoting the forward end of said reel supporting frame from said draft frame for up and down swinging movement, the last mentioned means limiting said supporting frame as to fore-and-aft movement with respect to said draft frame while permitting predetermined guided up and down movement of the forward end of said reel supporting frame with respect to said draft frame, resilient means interconnected between said draft frame and the rearward end of said reel supporting frame for counterbalancing the downward movement of said supporting frame, and means for resiliently suspending the forward end of said reel supporting frame from said draft frame for counterbalancing said guided up and down movement for floatingly pivotally supporting said reel.

8. In a side-delivery rake having a draft frame, ground wheels for supporting said draft frame in an elevated position, said wheels being positioned in substantially coaxial relationship, a reel, and a reel supporting frame for rotatably carrying said reel, the combination with said rake of means for resiliently suspending said reel supporting frame from said draft frame so as to position said reel supporting frame transversely between said ground wheels so that the right hand wheel is at the rear of said supporting frame and the left hand wheel is forward of said supporting frame, said means including means for pivoting the forward end of said reel supporting frame from said draft frame for up and down swinging movement, the last mentioned means limiting movement of said reel supporting frame as to fore-and-aft movement with respect to said draft frame while permitting predetermined guided up and down movement of the forward end of said reel supporting frame with respect to said draft frame, resilient means interconnected between said draft frame and the rearward end of said reel supporting frame for counterbalancing the swinging movement of said supporting frame, and means for resiliently suspending the forward end of said supporting frame from said draft frame for counterbalancing said guided up and down movement for floatingly pivotally supporting said reel.

9. In a side delivery rake a draft frame comprising forwardly converging side members, a cross member secured adjacent the forward end thereof, a draft means extending forwardly therefrom and adapted to be attached to a propelling means for supporting the forward end of the draft frame, a two-wheel drop axle for supporting the rearward end of said draft means in an elevated position, said drop axle including supporting land wheels, said wheels being positioned in substantially coaxial relationship, a rotatable axle shaft, and means for driving said axle shaft from said wheels, a reel supporting frame, pivoting means secured adjacent the rearward end of one of said side members and adjacent the forward end of the other side member so as to pivotally support the forward end of the reel supporting frame for up and down swinging movement between said land wheels so that the right hand wheel is rearward of said reel supporting frame and the left hand wheel is forward of said reel supporting frame, said pivoting means limiting said reel supporting frame as to fore-and-aft movement while permitting predetermined up and down guided movement of the forward end of the reel supporting frame with respect to said draft frame, resilient means interconnected between the draft frame and the rearward end of said reel supporting frame for counterbalancing the swinging movement of said reel supporting frame about said pivoting means, a reel rotatably secured in said reel supporting frame, resilient means interconnected with the forward end of said reel supporting frame and said draft frame for resiliently counterbalancing said reel supporting frame with respect to said guided up and down movement for pivotally resiliently suspending said reel supporting frame, means for swinging said reel supporting frame from an operative position to a transport position, and means for driving said reel from said axle shaft.

10. In a side delivery rake a draft frame comprising forwardly converging side members, a cross member secured adjacent the forward end thereof, a draft means extending forwardly therefrom and adapted to be attached to a propelling means for supporting the forward end of the draft frame, a two-wheel drop axle for supforting the rearward end of said draft means in an elevated position, said drop axle including supporting land wheels, said wheels being positioned in substantially coaxial relationship, a rotatable axle shaft, and means for driving said axle shaft from said wheels, a reel supporting frame, pivot supporting arms extending forwardly from said reel supporting frame, pivoting means secured adjacent the rearward end of one of said side members and adjacent the forward end of the other of said side members for pivotally supporting said pivot supporting arms, said pivoting means having vertical guide ways formed therein for permitting guided vertical movement of said pivot supporting arms therein, said reel supporting frame being positioned obliquely between said land wheels, a reel rotatably supported in said reel supporting frame, resilient means interconnected between said draft frame and the rearward end of said reel supporting frame for counterbalancing the swinging movement of said reel supporting frame about said pivoting means, resilient means for counterbalancing said pivot supporting arms with respect to said guided up and down movement in said pivoting means for pivotally resiliently suspending the forward end of said reel supporting frame, means for swinging said reel supporting frame from an operative position to a transport position, and means for driving said reel from said axle shaft.

11. In a rake disposed to be drawn behind a propelling unit, a pair of substantially co-axial spaced wheels, a transverse frame extending between the wheels, a forwardly extending drawbar fixed to the frame, a raking reel disposed diagonally of the direction of travel between the wheels, a vertical plane through the axis of said wheels intersecting the axis of said reel at a point adjacent the center of the axial length of said reel, said frame being raised sufficiently between the wheels to clear the reel, suspension means carrying the reel slidably and pivotally beneath the frame, and means for rotating the reel from rotation of the spaced wheels said rake being substantially symmetrical in shape for easy maneuverability on said pair of spaced wheels.

12. A hinge suspension for use in an agricultural implement having a part to be resiliently and pivotally suspended, said hinge comprising an upright slotted member fixed against up and down movement relative to the horizontal, a pintle rockably engaged in the slot thereof and movable up and down within the confines of said slot, a bracket portion on the upper extremity of said slotted member, an anchorage on said pintle, and spring means extending between said bracket and said anchorage for counterbalancing at least part of the weight on said pintle.

13. In a side delivery rake, having a movable supporting frame, a reel and a reel supporting frame for rotatably carrying said reel, the combination with said rake of means for suspending said reel supporting frame from said movable frame, said means including means for pivotally supporting the reel supporting frame adjacent its forward end from said movable frame for up-and-down swinging movement while holding said reel supporting frame against fore-and-aft swinging movement with respect to said movable frame, and while permitting predetermined guided up-and-down movement of the forward end of said reel supporting frame, means for resiliently counterbalancing the front end of said reel supporting frame with respect to said up-and-down guided movement for floatingly pivoting said reel supporting frame, and resilient means between the rearward end of said reel supporting frame and said movable frame for counterbalancing the up-and-down swinging movement of said reel supporting frame.

14. In a side delivery rake having a movable draft frame, a reel and a reel supporting frame for rotatably carrying said reel, the combination with said rake of means for resiliently pivoting said supporting frame from said draft frame, said means including means for pivotally supporting the forward end of said reel supporting frame from said draft frame for up-and-down swinging movement, said last mentioned means holding said reel supporting frame against fore-and-aft swinging movement with respect to said draft frame while permitting predetermined guided up-and-down movement of said reel supporting frame with respect to said draft frame, and means for resiliently suspending said reel supporting frame from said draft frame whereby the front end of said reel supporting frame is counterbalanced with respect to said up-and-down guided movement for floatingly pivoting said reel.

15. In a side delivery rake having a movable draft frame, a reel, and a reel supporting frame for rotatably carrying said reel, the combination with said rake of means for pivoting the forward end of said reel supporting frame to said draft frame for up-and-down swinging movement, said means holding said reel supporting frame against fore-and-aft swinging movement with respect to said draft frame while permitting predetermined guided up-and-down movement at the forward end of said reel supporting frame with respect to said draft frame, resilient means interconnected between the rearward end of said reel supporting frame and said draft frame for counterbalancing the downward swinging movement of said reel supporting frame, a force transmitting means carried by said draft frame and connected to said reel supporting frame for swinging said reel supporting frame to an inoperative position with respect to the ground, and means for resiliently suspending the forward end of said reel supporting frame from said draft frame for counterbalancing the forward end of said reel supporting frame with respect to said guided up-and-down movement for floatingly pivotally supporting said reel.

16. An angle setting mechanism for use in an agricultural implement of the type including a reel-like structure having a plurality of peripheral elements which revolve with the structure while remaining substantially parallel to a predetermined plane and having like sprockets on said elements, a stationary sprocket on the axis of said structure and having a one to one ratio, with the aforementioned like sprockets, and a chain engaging said like sprockets and said stationary sprocket; the combination of a supporting bar, a bearing element on said bar including a yoke, a sleeve rockably supported in said yoke, a reel shaft journaled in said sleeve, a driving member on said reel shaft, said stationary sprocket being fixed on one end of said sleeve, a lever pivotally mounted on said sleeve for rocking it and retaining it in adjusted position for maintaining said elements in desired relation to said predetermined plane, said lever being swingable independently of said sleeve in the direction of the axis thereof but dependently with said sleeve circumferentially of said sleeve, a quadrant carried by said supporting bar, detent means engageable between said lever and said quadrant by the aforesaid swinging of said lever in the direction of the axis of said sleeve, and resilient means operatively associated with said lever for urging said lever to swing into locking relationship with said quadrant.

17. In a rake disposed to be drawn behind a propelling unit, a pair of substantially co-axial spaced wheels, a transverse frame extending between the wheels, a forwardly extending drawbar fixed to the frame, a raking reel disposed diagonally of the direction of travel between the wheels, a vertical plane through the axis of said wheels intersecting the axis of said reel at a point adjacent the center of the axial length of said reel, said frame being raised sufficiently between the wheels to clear the reel, suspension means carrying the reel pivotally and for up and down sliding movement, and means for rotating the reel from rotation of the spaced wheels, said rake being substantially symmetrical in shape for easy maneuverability on said pair of spaced wheels.

18. In a rake disposed to be drawn behind a propelling unit, a pair of substantially co-axial spaced wheels, a transverse frame extending between the wheels, a forwardly extending drawbar fixed to the frame, a raking reel disposed diagonally of the direction of travel between the wheels, a vertical plane through the axis of said wheels intersecting the axis of said reel at a point adjacent the center of the axial length of said reel, said frame being raised sufficiently between the wheels to clear the reel, suspension means carrying the reel for up and down sliding movement beneath the frame, and means for rotating the reel from rotation of the spaced wheels, said rake being substantially symmetrical in shape for easy maneuverability on said pair of spaced wheels.

19. In a rake disposed to be drawn behind a propelling unit, a pair of substantially co-axial spaced wheels, a transverse frame extending between the wheels, a forwardly extending drawbar fixed to the frame, a raking reel disposed diagonally of the direction of travel between the wheels, a vertical plane through the axis of said wheels intersecting the axis of said reel at a point adjacent the center of the axial length of said reel, said frame being raised sufficiently between the wheels to clear the reel, suspension means carrying the reel pivotally beneath the frame, and means for rotating the reel from rotation of the spaced wheels, said rake being substantially symmetrical in shape for easy maneuverability on said pair of spaced wheels.

References Cited in the file of this patent

UNITED STATES PATENTS

| | | |
|---|---|---|
| 2,041,182 | Hume et al. | May 19, 1936 |
| 2,336,117 | Moschel et al. | Dec. 7, 1943 |
| 2,518,389 | Sisulak | Aug. 8, 1950 |
| 2,583,383 | McClellan | Jan. 22, 1952 |
| 2,595,788 | Hill | May 6, 1952 |
| 2,635,410 | Hill | Apr. 21, 1953 |
| 2,635,412 | Schroeppel | Apr. 21, 1953 |